Figure 1:
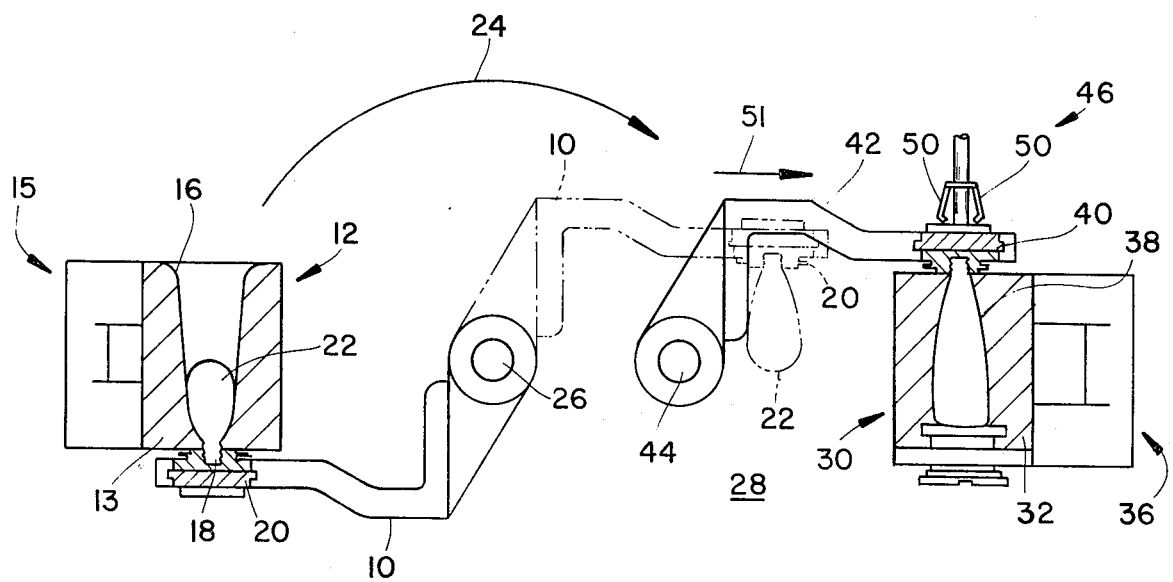

United States Patent [19]

Zappia

[11] 4,058,388
[45] Nov. 15, 1977

[54] APPARATUS FOR FORMING GLASSWARE WITH SHIFTING INVERT AND REVERT MECHANISM

[75] Inventor: Anthony T. Zappia, Carmel, Ind.

[73] Assignee: Ball Packaging Products, Inc., Muncie, Ind.

[21] Appl. No.: 718,404

[22] Filed: Aug. 30, 1976

[51] Int. Cl.$^2$ .................... C03B 9/00; C03B 23/00
[52] U.S. Cl. .................................. 65/229; 65/230; 65/239; 65/241; 65/244; 65/80
[58] Field of Search .................. 65/80, 242, 239, 235, 65/229, 230, 244, 241, 77

[56] References Cited

U.S. PATENT DOCUMENTS

| | | | |
|---|---|---|---|
| 1,992,951 | 3/1935 | Howard | 65/80 X |
| 2,151,876 | 3/1939 | Wadman | 65/230 |
| 3,216,813 | 11/1965 | Mumford | 65/239 |
| 3,230,061 | 1/1966 | Trudeau | 65/239 X |
| 3,445,218 | 5/1969 | Trudeau | 62/235 |
| 3,759,686 | 9/1973 | Trahan | 65/235 X |
| 4,002,454 | 1/1977 | Rowe | 65/229 |
| 4,004,906 | 1/1977 | Rowe | 65/229 |
| 4,010,021 | 3/1977 | Foster | 65/229 |

Primary Examiner—S. Leon Bashore
Assistant Examiner—Frank W. Miga
Attorney, Agent, or Firm—Jenkins, Coffey & Hyland

[57] ABSTRACT

Glassware forming apparatus includes a parison mold, a blow mold, a pair of neck rings for supporting glassware blanks, first and second invert arms for supporting the neck rings and first and second arbors for supporting the first and second invert arms, respectively. The invert arms support their respective neck rings for movement in a common vertical plane. The axes of the arbors extend generally parallel to one another and generally perpendicular to the common plane. The molds have parallel vertical axes lying in said common vertical plane. Apparatus is provided for shifting the arbors such that their axes move toward and away from one another during an operating cycle. Apparatus is provided for pivoting the arbors about their axes to move the neck rings in invert and revert arcs between the parison mold and the blow mold. The method comprises the steps of moving the neck rings into registry with the parison molds to receive a gob of molten glass to form a blank, inverting the neck rings to support the blanks at a reheat station and then shifting the neck rings to present the blanks for engagement by a blow mold.

10 Claims, 3 Drawing Figures

U.S. Patent  Nov. 15, 1977  Sheet 1 of 2  4,058,388

APPARATUS FOR FORMING GLASSWARE WITH SHIFTING INVERT AND REVERT MECHANISM

This invention relates to methods and apparatus for forming glassware.

Reference is made here to my two co-pending United States patent applications, Ser. No. 718,405 and Ser. No. 718,406 both titled GLASSWARE FORMING APPARATUS AND METHOD, filed of even date herewith and assigned to the same assignee as the present invention.

There is a type of glassware forming apparatus known in the glass industry as an individual section machine. The system includes a parison mold in which a blank is formed upside down in a neck ring by dropping a gob of molten glass through an opening in the parison mold and allowing the molten glass to flow toward the bottom of the parison mold. The neck ring covers an opening at the bottom of the parison mold. As the molten glass flows through the mold and into the neck ring, the surface of the blank chills somewhat, forming a protective scale about its exterior, while its interior remains molten.

The neck ring is carried upon an arm, called an invert arm, the other end of which is attached to an arbor. The arbor, which is generally horizontally oriented, pivots about a horizontal axis to move the neck ring through an arc in a generally vertical plane. The parison mold opens and the neck ring, which carries the blank, is moved in this arc in an inverting motion (so called because it turns the blank, which is upside down in the parison mold, right side up).

The right-side-up blank is present at a blow mold. The blow mold closes around the right-side-up blank, and the neck ring releases the blank and "reverts" with the arbor to a position underlying the parison mold. The parison mold can then close in preparation for receiving a fresh gob of molten glass to be formed into another glassware blank. The firstmentioned blank is allowed to reheat in the blow mold for a predetermined amount of time, usually on the order of one and one-half seconds. The blank reheats because of the molten glass contained within its walls. It should be remembered that this molten glass does not flow since the outer surface of the blank has been chilled to form scale around the molten glass. After the blank is reheated, the neck thereof is engaged by a blow head and is blown into a finished article of glassware. The blow mold then opens and the finished article is engaged by a pair of take-out jaws, usually mounted on the blow head, and removed from the blow mold. The blow mold is then ready to receive the next blank which will be inverted into it.

It will be noted that, in such prior-art individual section systems, reheating of the blank is allowed to occur in the blow mold. Thus, the blow mold temperature will vary as the blow mold is used. Additionally, use of the blow mold to support the blank during reheating consumes time in the blow mold which is not attributable to the blowing operation.

Accordingly, it is an object of the present invention to provide an improved apparatus and method which avoids certain shortcomings of the prior-art individual section glassware forming apparatus.

According to the present invention, a glassware forming apparatus comprises a parison mold, a blow mold, a pair of neck rings for supporting glassware blanks, first and second invert arms for supporting the neck rings and first and second arbors for supporting the first and second invert arms, respectively. The invert arms support their respective neck rings for movement in a common vertical plane, and the molds have vertically extending axes lying in the common plane. The axes of the arbors extend generally parallel to one another and generally perpendicular to the common plane. Means are provided for shifting the arbors such that their axes move toward and away from one another during an operating cycle. Means are provided for pivoting the arbors about their axes to move the neck rings in invert and revert arcs between the parison mold and the blow mold.

In a preferred embodiment of the present invention, the shifting means shifts the arbors such that the arbor axes cross one another twice during each complete cycle of operation of the apparatus. "Complete cycle," as used herein and in the appended claims, means a cycle of operation of the apparatus in which one of the invert arms moves its respective neck ring from a position beneath the parison mold, through its invert motion, through a shift to convey a glassware blank into the blow mold, through a revert motion, and through another shift to return to its starting position beneath the parison mold.

Further, according to the present invention, the invert arms are offset and the arbors are on opposite sides of the common plane to prevent interference between the invert arms and arbors as the neck rings are moved in the common plane.

Additionally, in a preferred embodiment of the present invention, the means for pivoting the first and second arbors about their respective axes comprises pinion gears mounted on the arbors and racks engaging the pinion gears. The racks are driven by selectively actuable piston-and-cylinder arrangements. Additionally, the shifting means comprises a piston-and-cylinder arrangement coupled to each of the arbors.

Further, according to the present invention, a method for forming hollow glassware comprises the steps of shifting a first neck ring into engagement with the parison mold, depositing a gob of molten glass in the parison mold so that the glass flows to form a first blank supported by the first neck ring and inverting the first neck ring to support the first blank at a reheat position. A second neck ring is then shifted to a position in engagement with the parison mold and a gob of molten glass is deposited into the parison mold so that the glass flows to form a second blank supported by the second neck ring. The first neck ring is then shifted from the reheat position to a position for engagement by a blow mold. The blow mold closes and the first neck ring releases the first blank, leaving the first blank supported in the blow mold. The first neck ring is then reverted to the waiting position. The second neck ring is then inverted to support the second blank at the reheat position and the first neck ring is shifted into a position to receive another gob of molten glass.

The invention can best be understood by referring to the following description of an embodiment and the accompanying drawings which illustrate that embodiment.

Figure 2:
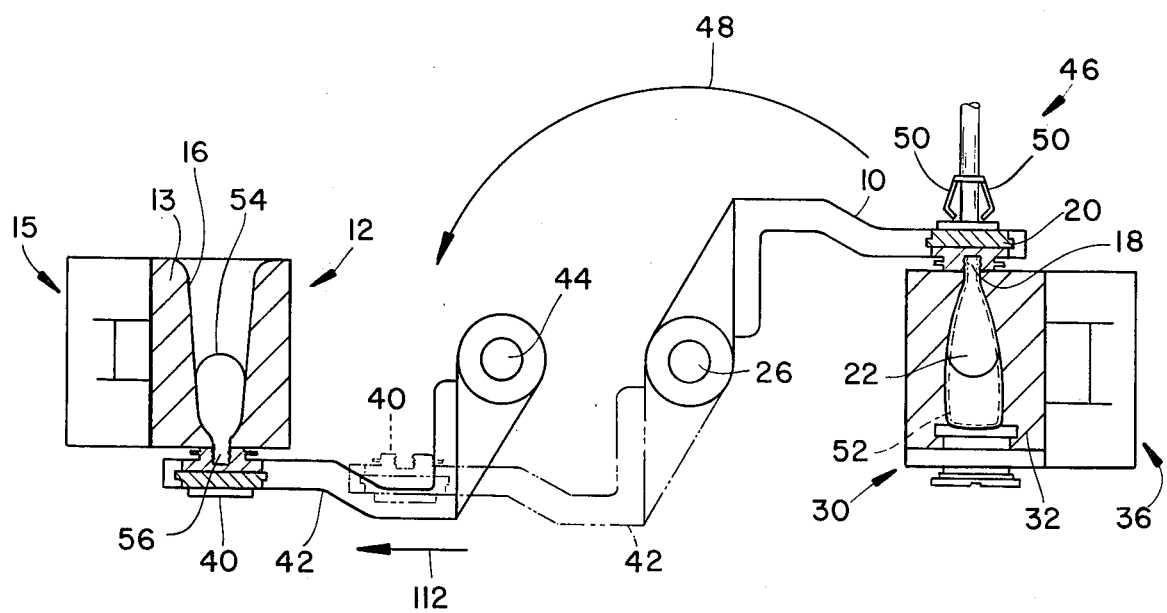
Figure 3:
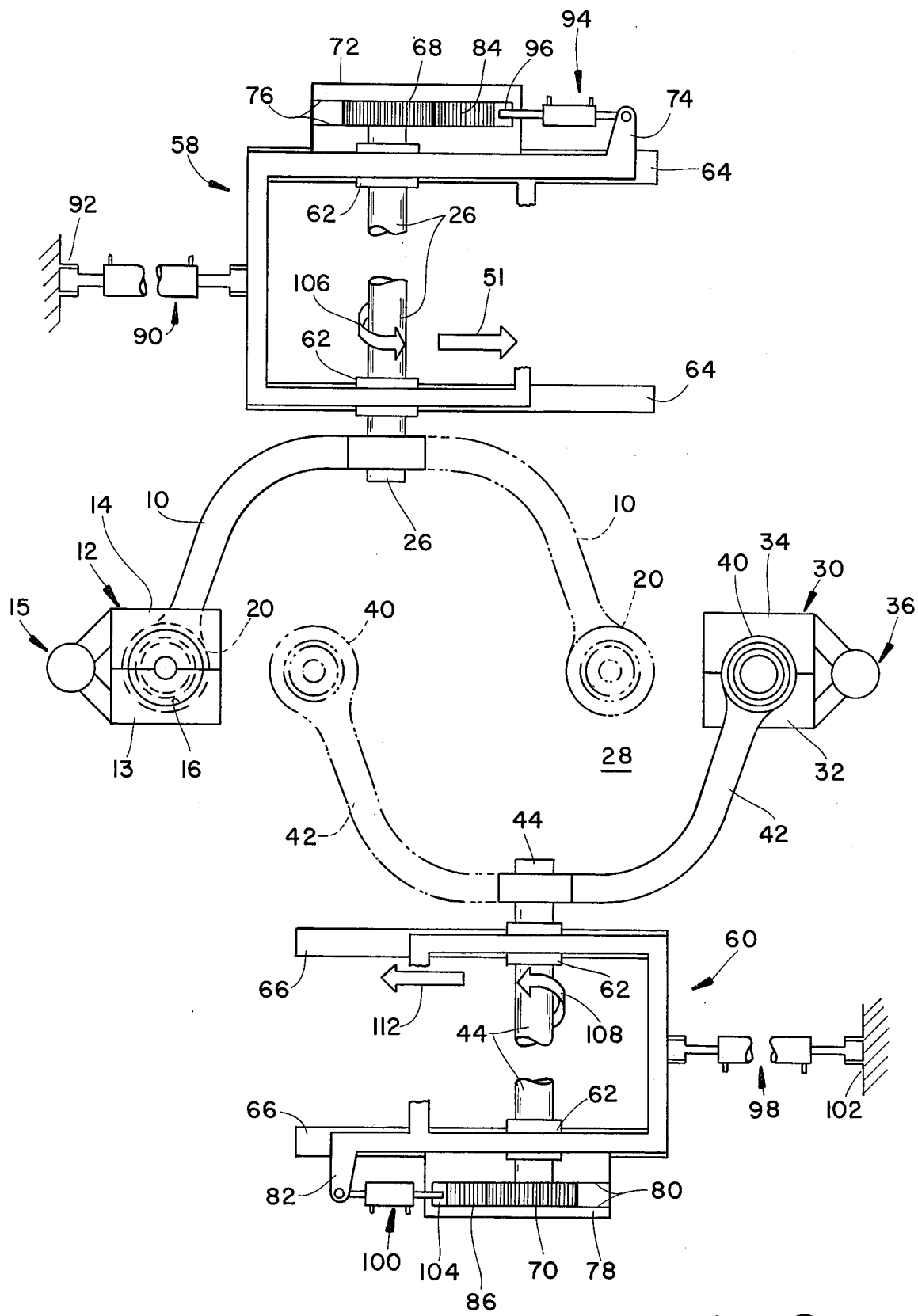

In the drawings:

FIG. 1 is a fragmentary sectional side elevational view of the apparatus of the present invention at the beginning of an operating cycle, with the position of part of the apparatus after the first phase of the operating cycle being illustrated in broken lines;

FIG. 2 is a fragmentary sectional side elevational view of the apparatus of FIG. 1 after a later phase of the operating cycle, with the position of part of the apparatus in a still later phase being illustrated in broken lines; and FIG. 3 is a fragmentary top plan view of the apparatus of the invention with positions of parts of the apparatus in subsequent phases of the operating cycle being illustrated in broken lines.

FIG. 1 illustrates the position of an invert arm 10 and a parison mold 12 at the beginning of an operating cycle. Mold 12 includes two vertical halves 13, 14 joined together at a vertically extending rearward hinge 15. A gob of molten glass is deposited through an upwardly directed opening 16 in parison mold 12 and a bottle neck 18 is formed in a neck ring 20 as the molten glass flows downwardly in the parison mold. After a predetermined amount of time, e.g., 1½ seconds, during which the exterior surface of the molten glass chills and solidifies, parison mold 12 opens. A blank 22, formed in parison mold 12 and suspended from the neck ring 20, is inverted in the direction of arrow 24 by invert arm 10 upon an arbor 26. This is the position of invert arm 10 and blank 22 illustrated in broken lines in FIG. 1.

Blank 22 remains suspended from neck ring 20 at a reheat station 28 outside of a blow mold 30 for a predetermined reheat period, e.g., 1½ seconds. Blow mold 30 includes two vertical halves 32, 34 joined together at a vertically extending rearward hinge 36. During the reheat period for blank 22, a previously transferred blank is being blown to a bottle 38 in mold 30. Bottle 38 is supported from another neck ring 40, which is carried on an invert arm 42 mounted on an arbor 44. Bottle 38 is blown by a blow head 46 through neck ring 40. Blow head 46 is adapted to descend vertically from above blow mold 30 into engagement with neck rings 20, 40 after blow mold 30 closes.

As soon as blowing of bottle 38 is completed, blow head 46 disengages neck ring 40 and is moved vertically upwardly a short distance by control apparatus (not shown). Neck ring 40 opens to release the neck of bottle 38. Then, arbor 44 reverts invert arm 42 in the direction of arrow 48 in FIG. 2. This places neck ring 40 in the position illustrated in broken lines in FIG. 2 in preparation for movement under parison mold 12. Then blow head 46 descends again into a position adjacent the neck of bottle 38 and a pair of take-out jaws 50 engages the neck of bottle 38. Blow mold 30 opens and blow head 46 ascends, carrying the finished bottle 38 away from the forming apparatus.

Arbor 26 then shifts in the direction of arrow 51 (FIGS. 1 and 3), carrying blank 22 to a position in registry with blow mold 30. This position is illustrated in solid lines in FIG. 2. Blow mold 30 closes around blank 22 and a fresh bottle 52, illustrated in broken lines in FIG. 2, is blown through neck ring 20. At the same time, a gob of molten glass is being deposited in parison mold 12. The molten glass flows to provide a fresh blank 54 in parison mold 12. Blank 54 includes a bottle neck 56, which is formed in neck ring 40.

This completes a half cycle of the operation of the illustrated glassware forming apparatus. During the next successive half cycle, arbor 44 and its associated components duplicate the motion executed by arbor 26 and its associated components during the described half cycle. During the next successive half cycle, arbor 26 and its associated components duplicate the motion executed by arbor 44 and its associated components during the described half cycle.

Referring now to FIG. 3, arbors 26, 44 are supported upon movable frames 58, 60, respectively. The arbors are pivotally supported in the frames in a plurality of bearings 62. Frames 58, 60 are supported for longitudinal movement perpendicular to the axes of arbors 26, 44, respectively, in pairs of tracks 64, 66, respectively. While in the illustrated embodiment the tracks are beneath frames 58, 60, it should be understood that frames 58, 60 could be suspended from overhead tracks.

Arbor 26 includes at its end remote from invert arm 10, a pinion gear 68. Arbor 44 includes at its end remote from invert arm 42, a pinion gear 70.

Frame 58 includes a horizontal bracket 72 and a horizontal bracket 74. Bracket 72 provides a slideway 76 which extends longitudinally of tracks 64. Frame 60 includes a horizontally extending bracket 78 having a slideway 80. Frame 60 further includes a bracket 82. Two racks 84, 86 are longidudinally slidably mounted in slideways 76, 80, respectively. Rack 84 engages pinion gear 68 on arbor 26. Rack 86 engages pinion gear 70 on arbor 44.

A two-way piston-and-cylinder arrangement 90, e.g., a pneumatic or hydraulic cylinder, is coupled between frame 58 and a stationary point 92. A piston-and-cylinder arrangement 94 is coupled between bracket 74 and an end 96 of rack 84. Similar two-way piston-and-cylinder arrangements 98, 100 are coupled between frame 60 and a stationary point 102, and between bracket 82 and an end 104 of rack 86, respectively.

Actuation of piston-and-cylinder arrangement 94 moves rack 84 in a direction opposite the direction of arrow 51. This turns pinion gear 68 and arbor 26 in the direction of arrow 106, inverting arm 10 to the position illustrated in broken lines in FIGS. 1 and 3. Neck ring 20 thereby moves through the invert arc 24 (see FIG. 1) to its position illustrated in broken lines in FIGS. 1 and 3. Actuation of piston-and-cylinder arrangement 100 moves rack 86 in slideway 80, causing pinion gear 70 and arbor 44 to turn as indicated by arrow 108. This motion reverts arm 42 and neck ring 26 through arc 48 (see FIG. 2) to the position illustrated in broken lines in FIGS. 2 and 3.

Actuation of piston-and-cylinder arrangement 90 in a first direction moves frame 58 along tracks 64, shifting neck ring 20 in the direction of arrow 51 (FIGS. 1 and 3), from the reheat position 28, illustrated in broken lines in FIGS. 1 and 3, into a position overlying blow mold 30 (see FIG. 2). Actuation of piston-and-cylinder arrangement 90 in a second direction returns frame 58 to the position illustrated in FIG. 3.

Actuation of piston-and-cylinder arrangement 98 in a first direction shifts neck ring 40 in the direction of arrow 112 (FIGS. 2-3), from its position illustrated in broken lines in FIGS. 2 and 3 to its position illustrated in solid lines in FIG. 2. Actuation of arrangement 98 in a second direction returns frame 60 to its position illustrated in FIG. 3.

FIG. 3 also illustrates the desired "offset" shape of invert arms 10, 42. This offset shape allows arms 10, 42 to transfer glassware blanks in the same vertical plane between parison mold 12, reheat station 28 and blow mold 30 without interfering with one another or damaging the blanks being transferred.

Means, such as fluid circuit means (not shown) is provided for synchronizing the operation of frames 58, 60, slideways 64, 66, piston-and-cylinder arrangements 90, 98, pinion gears 68, 70, racks 84, 86, piston-and-cylinder arrangements 84, 100, and brackets 74, 82. Such synchronizing means helps to prevent interference between neck rings 20, 40 during their movement.

A significant advantage of this system is that no reheat time is required after the blank 22 is deposited in the blow mold 30. Rather, the reheat operation for blank 22 is conducted outside of mold 30 while bottle 38 is being blown through neck ring 40 in the mold. It will be appreciated that blow mold 30 runs substantially cooler with this system than with the conventional invert-revert system because reheating in the blow mold is avoided. Thus, blanks 22 ready for blowing in mold 30 will exhibit a better scale. Additionally, blowing cycles in blow mold 30 will require reduced time, since with a cooler mold the blown bottles 38 will solidify more quickly.

What is claimed is:

1. Glassware forming apparatus comprising a parison mold, a blow mold, a pair of neck rings for supporting glassware blanks, first and second invert arms for supporting the neck rings for movement in a common vertical plane, said molds opening in said common vertical plane, first and second arbors for supporting the first and second invert arms, respectively, the first and second arbors having axes which extend generally parallel to one another and perpendicularly to the common plane, the first and second invert arms being offset to prevent interference between them as they move the neck rings in the common vertical plane, means for shifting the arbors such that their axes move toward and away from one another during an operating cycle, and means for pivoting the arbors about their axes, said shifting means and pivoting means cooperating to invert the first neck ring with a newly formed blank suspended therein, to hold the blank at a station outside the blow mold while the second neck ring is in position over the blow mold, then to revert the second neck ring to a position adjacent the parison mold, then to shift the blank supported in the first neck ring into the blow mold, to shift the second neck ring into position to receive the next blank formed in the parison mold, to invert the second neck ring to hold the last-mentioned blank at the station outside the blow mold, to revert the first neck ring to the position adjacent the parison mold, to shift the second neck ring to convey the last-mentioned blank into the blow mold, and to shift the first neck ring into position to receive the next blank to be formed in the parison mold.

2. The apparatus of claim 1 wherein the shifting means shifts the arbors such that the arbor axes cross one another twice during each complete cycle of operation of the apparatus.

3. The apparatus of claim 1 wherein the pivoting means inverts and reverts each neck ring once during each complete cycle of operation of the apparatus.

4. The apparatus of claim 1 wherein the arbors lie on opposite sides of the common plane to prevent interference between the invert arms and arbors during movement of the neck rings in their common plane.

5. The apparatus of claim 1 wherein the shifting means and pivoting means are synchronized to prevent interference between the neck rings during movement of the neck rings in their common vertical plane.

6. In a glassware forming apparatus comprising a parison mold, a blow mold, a first neck ring for supporting and conveying glassware blanks, a first invert arm for supporting the first neck ring, a first arbor for supporting the first invert arm and means for pivoting the first arbor about its axis to move the first neck ring in a vertical plane between a position adjacent the parison mold and a position adjacent the blow mold, the improvement comprising a second neck ring for supporting and conveying glassware blanks, a second invert arm for supporting the second neck ring, a second arbor for supporting the second invert arm, the second arbor having an axis generally parallel to the axis of the first arbor, means for pivoting the second arbor about its axis to move the second neck ring in the vertical plane of movement of the first neck ring, the first invert arm being offset on the first arbor and the second invert arm being offset on the second arbor, and means for shifting the first and second arbors, the pivoting and shifting means cooperating to invert the first neck ring from the parison mold to a reheat position while the second neck ring is in position over the blow mold, to revert the second neck ring to a position adjacent the parison mold, to shift the first neck ring from the reheat position to deposit a blank supported by it in the blow mold, to shift the second neck ring into engagement with the parison mold to receive a blank, to invert the second neck ring to the reheat position, to revert the first neck ring, to shift the second neck ring to deposit the blank supported thereby into the blow mold, and to shift the first neck ring into engagement with the parison mold to receive another blank during an operating cycle of the apparatus.

7. The apparatus of claim 6 wherein the means for pivoting the first and second arbors about their respective axes comprises pinion gears mounted on the arbors and racks engaging the pinion gears.

8. The apparatus of claim 7 and further comprising at least one piston-and-cylinder arrangement for driving the racks.

9. The apparatus of claim 6 wherein the shifting means comprises at least one piston-and-cylinder arrangement coupled to one of the arbors.

10. Glassware forming apparatus comprising a parison mold, a blow mold, a neck ring for supporting glassware blanks, an invert arm for supporting the neck ring for movement in a vertical plane extending between the parison mold and blow mold, an arbor for supporting the invert arm, the arbor having an axis which extends generally perpendicularly to the vertical plane, means for shifting the arbor such that its axis moves linearly between the parison mold and blow mold, and means for pivoting the arbor about its axis, the pivoting means inverting the neck ring from the parison mold to a reheat position, the shifting means then shifting the neck ring from the reheat position to transfer a blank supported thereby into the blow mold, the pivoting means then reverting the neck ring to a rest position out of engagement with the parison mold and the shifting means then shifting the neck ring into its position in engagement with the parison mold to receive another blank.

* * * * *